(12) United States Patent
Saita

(10) Patent No.: US 11,423,863 B2
(45) Date of Patent: Aug. 23, 2022

(54) INFORMATION PROCESSING APPARATUS AND NON-TRANSITORY COMPUTER READABLE MEDIUM

(71) Applicant: FUJIFILM BUSINESS INNOVATION CORP., Tokyo (JP)

(72) Inventor: Takayoshi Saita, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 17/060,931

(22) Filed: Oct. 1, 2020

(65) Prior Publication Data
US 2021/0233492 A1 Jul. 29, 2021

(30) Foreign Application Priority Data
Jan. 27, 2020 (JP) .............................. JP2020-011226

(51) Int. Cl.
- G09G 5/00 (2006.01)
- G09G 5/10 (2006.01)
- H04N 5/58 (2006.01)

(52) U.S. Cl.
CPC .................. *G09G 5/10* (2013.01); *H04N 5/58* (2013.01); *G09G 2320/0626* (2013.01); *G09G 2360/144* (2013.01)

(58) Field of Classification Search
CPC ............. G09G 5/10; G09G 2320/0626; G09G 2360/144; G09G 3/003; G09G 2340/0464; G09G 2354/00; G09G 2358/00; H04N 5/58; H04N 13/30; H04N 13/388; H04N 2013/40; H04N 2013/403; H04N 2013/405; G02B 30/25; G02B 30/35

See application file for complete search history.

(56) References Cited

U.S. PATENT DOCUMENTS

| | | | |
|---|---|---|---|
| 2011/0128555 A1* | 6/2011 | Rotschild | ................ G06F 3/017 356/625 |
| 2019/0228689 A1 | 7/2019 | Tokuchi | |

FOREIGN PATENT DOCUMENTS

| | | |
|---|---|---|
| JP | 2016-156892 A | 9/2016 |
| JP | 2019-128724 A | 8/2019 |

* cited by examiner

*Primary Examiner* — Adam R. Giesy
(74) *Attorney, Agent, or Firm* — Oliff PLC

(57) ABSTRACT

An information processing apparatus includes a processor configured to perform control to display, in the air, a first image that is observable in an ambient area of the first image and hinders a different image displayed in the air in a first area from being viewed from a second area. The first area is positioned on a first side of the first image. The first side faces a specific observer. The second area is positioned on a second side of the first image opposite to the first side. The processor is configured to perform control to display, in the air in the first area, a second image observable in an ambient area of the second image.

16 Claims, 10 Drawing Sheets

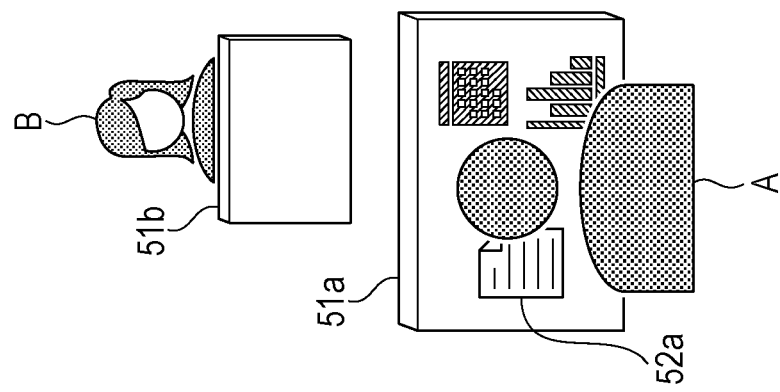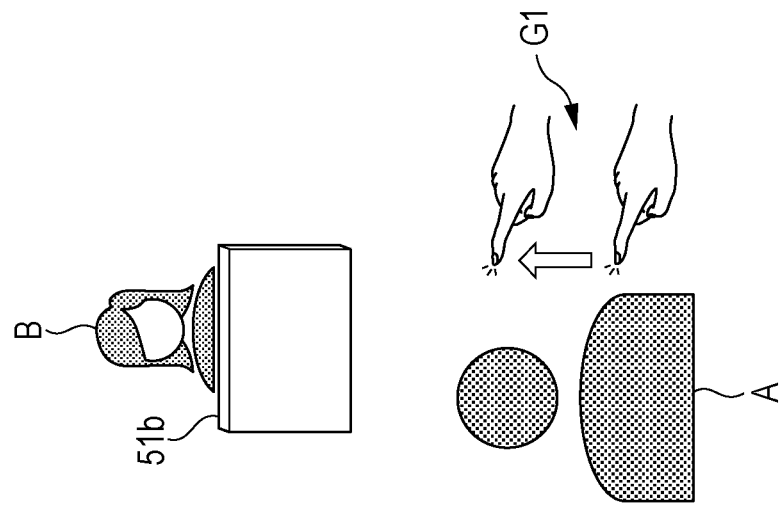

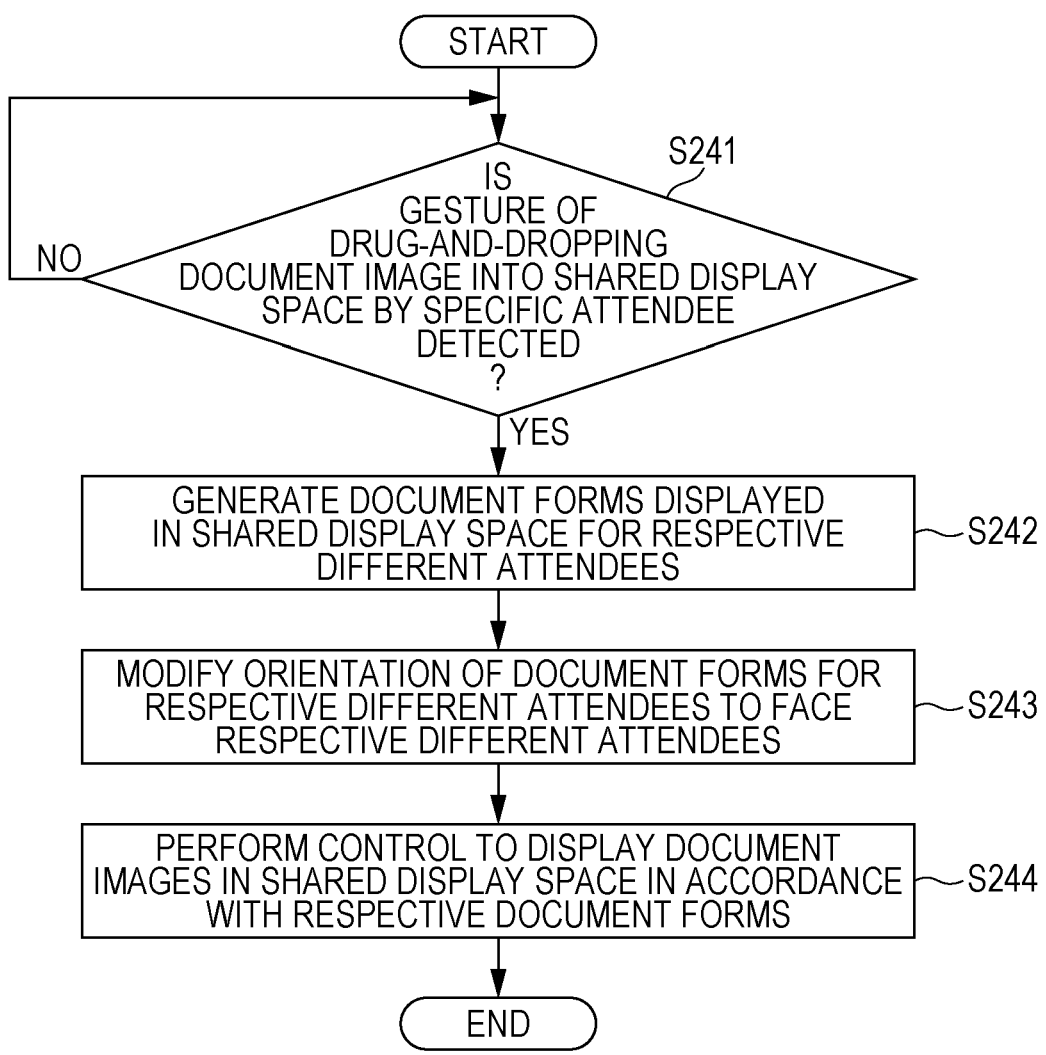

INFORMATION PROCESSING APPARATUS AND NON-TRANSITORY COMPUTER READABLE MEDIUM

CROSS-REFERENCE TO RELATED APPLICATIONS

This application is based on and claims priority under 35 USC 119 from Japanese Patent Application No. 2020-011226 filed Jan. 27, 2020.

BACKGROUND

(i) Technical Field

The present disclosure relates to an information processing apparatus and a non-transitory computer readable medium.

(ii) Related Art

A hologram display device including a spatial light modulator, a magnifying optical system, and a deflection optical system is known. On the basis of the reproduced wave front information of a hologram, the spatial light modulator receives an incident laser beam and modulates the laser beam on the basis of the reproduced wave front information of a hologram. The magnifying optical system magnifies the beam modulated by the spatial light modulator and forms an image. The deflection optical system is disposed on the image forming surface where the image of the modulated beam is formed. The deflection optical system changes the deflection direction of the modulated beam over time and thereby deflects the modulated beam to form a visual field in the entire annular circumferential area around the magnifying optical system with the light axis being centered (for example, see Japanese Unexamined Patent Application Publication No. 2016-156892).

The following visibility controller is also known. Specifically, the visibility controller acquires a captured image of the display surface of an aerial image, estimates an area where visibility is lowered in the aerial image on the basis of the captured image, and decides the displaying of an aerial image to include the estimated area (for example, see Japanese Unexamined Patent Application Publication No. 2019-128724).

SUMMARY

It is conceivable that multiple observers observe an image observable in an ambient area of the image. In this case, if a configuration in which the image observable in the ambient area is displayed in a state where an observer different from a specific observer is able to see the image is used, an image displayed to only the specific observer is likely to be seen by a different observer.

Aspects of non-limiting embodiments of the present disclosure relate to making an image displayed to a specific observer less likely to be seen by a different observer as compared with a case where an image observable in an ambient area of the image is displayed in a state where the different observer is able to see the image.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing apparatus including a processor configured to perform control to display, in the air, a first image that is observable in an ambient area of the first image and hinders a different image displayed in the air in a first area from being viewed from a second area. The first area is positioned on a first side of the first image. The first side faces a specific observer. The second area is positioned on a second side of the first image opposite to the first side. The processor is configured to perform control to display, in the air in the first area, a second image observable in an ambient area of the second image.

BRIEF DESCRIPTION OF THE DRAWINGS

An exemplary embodiment of the present disclosure will be described in detail based on the following figures, wherein:

FIGS. 4A and 4B are views illustrating an example of an operation for displaying a desktop image and a document image in the air at first;

FIG. 10 is a flowchart illustrating an example of second operations of the information display in the exemplary embodiment of the present disclosure in sharing the document image displayed in the private display space.

DETAILED DESCRIPTION

Hereinafter, an exemplary embodiment of the present disclosure will be described in detail with reference to the attached drawings.

Hardware Configuration of Information Display

Figure 1:
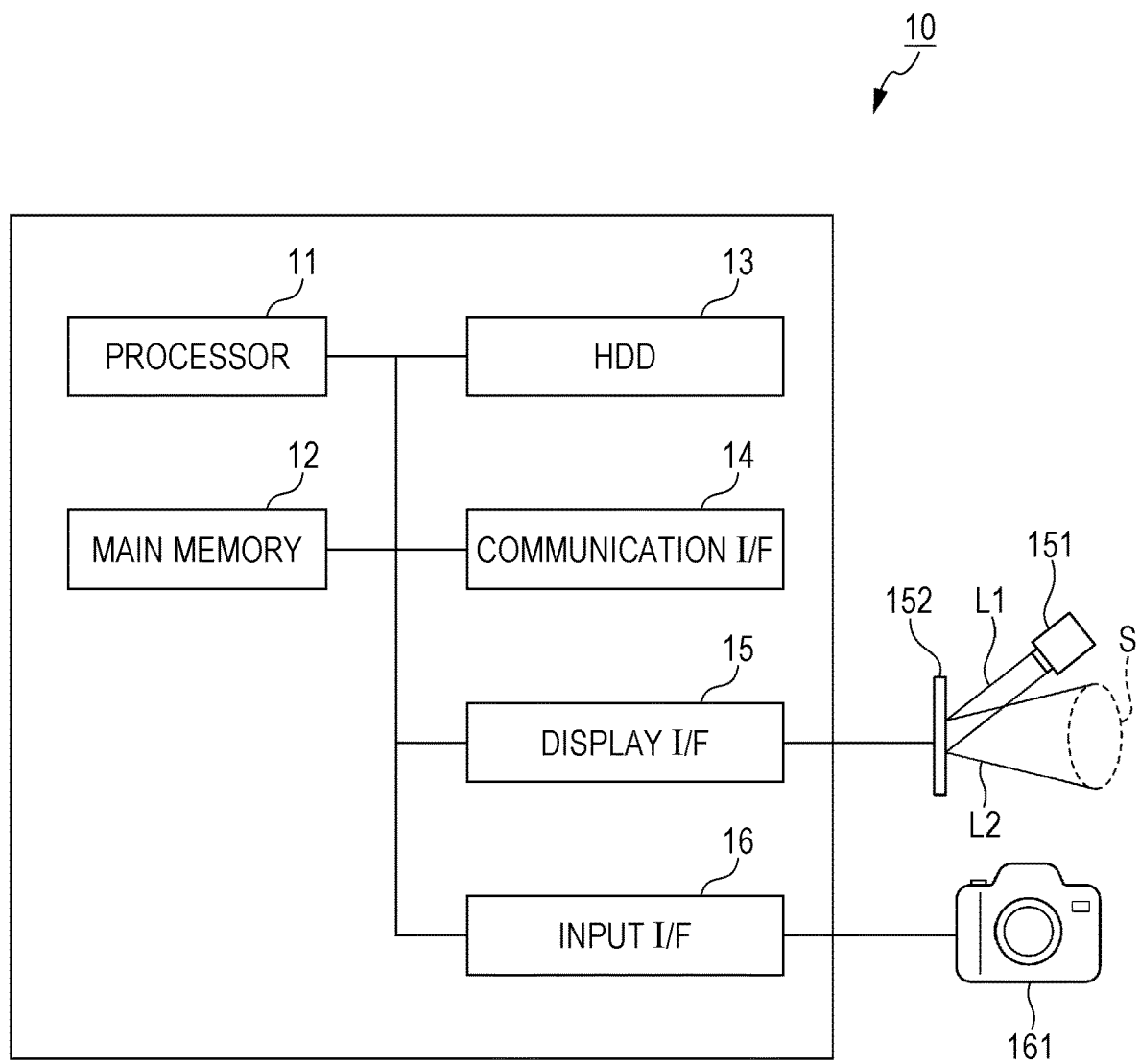
FIG. 1 is a diagram illustrating an example hardware configuration of an information display in the exemplary embodiment of the present disclosure.

FIG. 1 is a diagram illustrating an example hardware configuration of an information display 10 in this exemplary embodiment. The information display 10 is an example of an information processing apparatus and includes a processor 11 that is an arithmetic unit, a main memory 12 that is a memory, and a hard disk drive (HDD) 13, as illustrated in FIG. 1. The processor 11 runs various pieces of software such as an operating system (OS) and applications and thereby implements functions described later. The main memory 12 is a memory area where the pieces of software, data used for running the software, and the like are stored. The HDD 13 is a memory area where data input to the pieces of software, data output therefrom, and the like are stored. The information display 10 further includes a communication interface (I/F) 14 for communicating with an external apparatus, a display I/F 15 for outputting information to a display device, and an input I/F 16 for inputting information from the input device.

The display device connected to the display I/F 15 is described. As illustrated in FIG. 1, the display device includes a light source 151 and a spatial light modulator (SLM) 152.

The light source 151 emits reference light beams L1 that are coherent light to the SLM 152. Specifically, the light source 151 includes, for example, a collimating lens and a laser emitting unit. The light source 151 collimates laser beams emitted from the laser emitting unit to parallel rays by using the collimating lens and emits the laser beams as the reference light beams L1.

The SLM 152 modulates the incident reference light beams L1 on the basis of the reproduced wave front information of a hologram and emits the modulated reference light beams L1 as output light beams L2. The SLM 152 uses the output light beams L2 to display a solid image S in the air a predetermined distance away from the surface of the SLM 152. Specifically, the SLM 152 is, for example, a spatial light modulator (MEMS-SLM) using a micro electro mechanical systems (MEMS) or a spatial light modulator (LCOS-SLM) using a liquid crystal on silicon (LCOS). The SLM 152 displays interference fringes on the basis of the reproduced wave front information of the hologram. The reproduced wave front information indicates interference fringes to be used to modulate the reference light beams L1 to display a required solid image S. In other words, the reproduced wave front information indicates the pattern of interference fringes to display the desired solid image S.

The input device connected to the input I/F 16 is described. As illustrated in FIG. 1, the input device is a camera 161. The camera 161 includes an optical system (such as a lens) to form an image and thereby captures an image. A video camera is desirably used as the camera 161 because particularly an image of the movement of a meeting attendee is captured.

The communication I/F 14 is used in some cases for wireless communications with an acceleration sensor provided to a finger-worn wearable device or an operation input device such as a mouse and a keyboard; however, the function is not illustrated in FIG. 1.

Overview of Exemplary Embodiment

In this exemplary embodiment, the information display 10 performs control to display, in the air, a first image that is observable in an ambient area of the first image and hinders a different image displayed in the air in a first area from being viewed from a second area. The first area is positioned on a first side of the first image. The first side faces a specific observer. The second area is positioned on a second side of the first image opposite to the first side. The information display 10 also performs control to display, in the air in the first area, a second image observable in an ambient area of the second image.

In the following description, a 3-D image (hereinafter, also referred to as a desktop image) generated by imitating a desktop on the screen of a personal computer (PC) is taken as an example of the first image, and a 3-D image (hereinafter, also referred to as a document image) generated by imitating a document on the desktop is taken as an example of the second image. In addition, multiple attendees at a meeting proceeding with reference to document images displayed in the air are taken as an example of multiple observers including the specific observer and a different observer.

Figure 2:
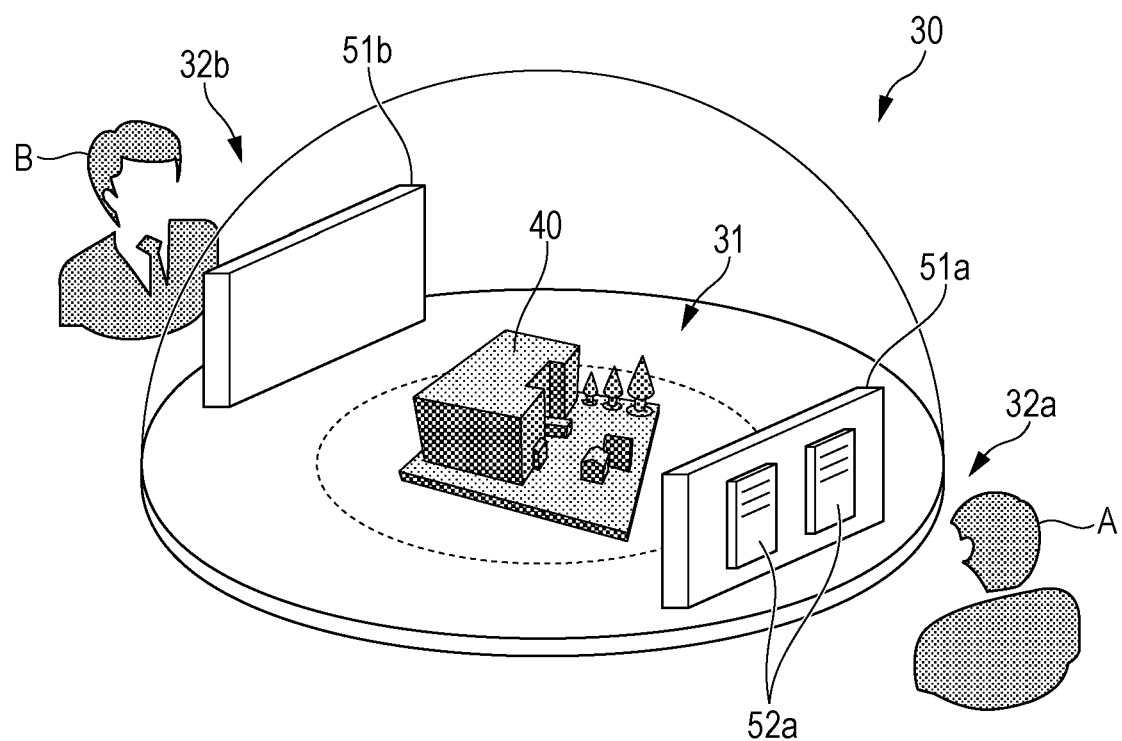
FIG. 2 is a view illustrating an example of a display space in which the information display in the exemplary embodiment of the present disclosure displays a three-dimensional (3-D) image.

FIG. 2 is a view illustrating an example of a display space 30 in which the information display 10 displays a 3-D image. As illustrated in FIG. 2, the display space 30 includes a shared display space 31 and private display spaces 32a and 32b.

The shared display space 31 is a display area shared by the multiple attendees. A 3-D image shared by the multiple attendees is displayed in the shared display space 31. Although a solid image 40 representing a three-dimensional model is displayed in FIG. 2, a plate-shaped 3-D image is displayed in some cases as to be described later.

The private display space 32a is a display area for an attendee A. In the private display space 32a, one or more 3-D images managed by the attendee A are displayed. In FIG. 2, a desktop image 51a is displayed in the attendee-B-side area in the private display space 32a, and a document image 52a is displayed in the attendee-A-side area for the desktop image 51a.

A private display space 32b is a display area for an attendee B. In the private display space 32b, one or more 3-D images managed by the attendee B are displayed. In FIG. 2, a desktop image 51b is displayed in the attendee-A-side area in the private display space 32b, and a document image 52b is displayed in the attendee-B-side area for the desktop image 51b. However, the document image 52b is not displayed because the document image 52b is hidden by the desktop image 51b and thus is not viewable.

FIG. 2 illustrates the pair of desktop images 51a and 51b, the pair of the private display spaces 32a and 32b, and the pair of document images 52a and 52b displayed thereon. However, if the elements of each pair do not have to be discriminated from each other, each element may be referred to as a private display space 32, a desktop image 51, or a document image 52. The case where the two attendees A and B have a meeting facing each other is herein assumed, and thus the two private display spaces 32 are illustrated. If three or more attendees have a meeting, three or more private display spaces 32 may be provided.

Figure 3:
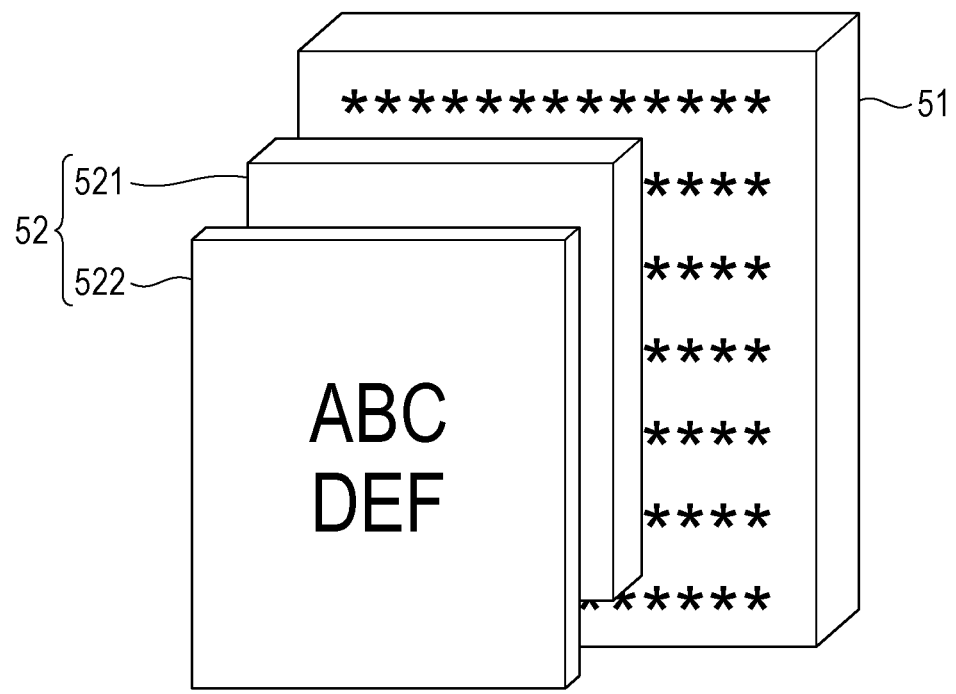
FIG. 3 is a view illustrating example plate-shaped 3-D images displayed in the air by the information display in the exemplary embodiment of the present disclosure.

FIG. 3 is a view illustrating example plate-shaped 3-D images displayed by the information display 10 in the air. As illustrated in FIG. 3, the plate-shaped 3-D images include the desktop image 51 and the document image 52. In the description of a desktop image 51 or a document image 52 herein, an attendee who manages the desktop image 51 or the document image 52 is referred to as a specific attendee, and one or more attendees other than the specific attendee are referred to as different attendees.

The desktop image 51 desirably has a rectangular outer edge shape from the viewpoint of consistency with the document image 52 imitating a paper document; however, the outer edge shape is not limited thereto. The desktop image 51 is desirably larger than the entire document image 52 to cover the entire document image 52.

The desktop image 51 desirably has a view-hindering image disposed within the desktop image 51. The view-hindering image hinders character information included in the document image 52 from being viewed by a different attendee. The view-hindering image may be, for example, a symbol, a pattern, a still image, or a moving image. As the symbol, a symbol repeated on all over the plane and thus hindering an object across the document image 52 from being viewed is desirably used, such as *, $, or #. FIG. 3 illustrates an example of repeating the symbol * on all over the plane. As the pattern, a camouflage pattern is exemplified. As a still image, an image easy to draw attention of a person, such as an electronic document, a web page, or computer graphics (CG) is conceivable. As the moving image, a random pattern movie (a moving image with bright spots flashing randomly such as a snow image on television (TV)), a moving image having a specific pattern moved in a predetermined direction or random directions, or a video movie of a scenery, a TV program, a film, or CG is conceivable.

Alternatively, to hinder the character information included in the document image 52 from being viewed by the different attendee, the luminance of the desktop image 51 may be set higher than the luminance of the document image 52. Specifically, the luminance of the image element of points, lines, and planes constituting the desktop image 51 or the luminance per unit area of the desktop image 51 may be set higher than the luminance of the image elements such as the points, the lines, and the planes of the document image 52 or the luminance per unit area of the document image 52.

The document image 52 is an image displayed in the specific-attendee-side area for the desktop image 51 as described above. The document image 52 desirably has layers of a paper-shaped image 521 corresponding to a paper sheet and a content image 522 disposed closer to the specific attendee than to the paper-shaped image 521 and corresponding to the content of a document printed on the paper sheet. The content image 522 has the content of the document such as characters, a figure, or a moving image. In this exemplary embodiment, the content image 522 is used as an example of a third image in which an object to be observed by the specific observer is formed.

A high ratio of contrast between the paper-shaped image 521 and the content image 522 is desirably used for high visibility of the content image 522. However, if the paper-shaped image 521 has a high degree of transparency to cause the pattern on the desktop image 51 to be seen through the paper-shaped image 521, and if the desktop image 51 has the view-hindering image, the view-hindering image is seen behind the content image 522 and thus causes poor visibility. Accordingly, if the desktop image 51 has the view-hindering image, the luminance of the paper-shaped image 521 is desirably set higher than the luminance of the desktop image 51. In this exemplary embodiment, the paper-shaped image 521 is used as an example of a fourth image. The fourth image is formed to improve the visibility of the third image. The fourth image is positioned between the first image and the second image. The fourth image has luminance higher than the luminance of the third image.

Displaying the content image 522 and the paper-shaped image 521 on the same plane causes the paper-shaped image 521 and the content image 522 to be mixed and thus lowers the visibility of the content. Accordingly, the content image 522 is desirably displayed closer to the specific attendee than the paper-shaped image 521 is. The contrast between the content image 522 and the paper-shaped image 521 is desirably set high by setting the luminance of the content image 522 lower than the luminance of the paper-shaped image 521. This prevents the content image 522 from being seen through the paper-shaped image 521 and the desktop image 51 and from being observed by the different attendee.

An example of a specific operation performed in the display space 30 is described. A scene of a meeting held by the attendees A and B facing each other is assumed also in this example.

FIGS. 4A and 4B are views illustrating an example of an operation for displaying the desktop image 51a and the document image 52a in the air at first.

As illustrated in FIG. 4A, the attendee A first makes a gesture G1 of swiping upwards in the private display space 32a.

As illustrated in FIG. 4B, the information display 10 then displays the desktop image 51a vertically in the area where the swiping is performed in the private display space 32a. The desktop image 51a is displayed vertically in this case but may be displayed in such a manner as to be tilted within a predetermined angle with the vertical. At this time, as illustrated in FIG. 4B, the information display 10 displays the document image 52a vertically in the attendee-A-side area for the desktop image 51a in the private display space 32a. The document image 52a may be an image having been disposed on the desktop image 51a when the gesture for displaying the desktop image 51a is made. Alternatively, the document image 52a may be an image that has not been disposed when the gesture for displaying the desktop image 51a is made but that is newly disposed the desktop image 51a. The document image 52a is also displayed vertically in this case but may be displayed in such a manner as to be tilted within a predetermined angle with the vertical. At this time, the document image 52a is viewable by the attendee A, but the viewing by the attendee B is limited. The document image 52a may be converted to a two-dimensional projection image to be displayed in the private display space 32a.

Figure 5C:
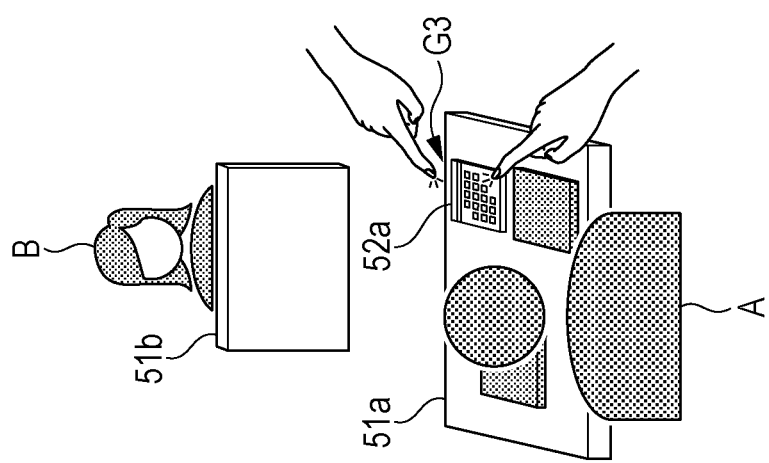
FIGS. 5A, 5B, and 5C are views illustrating an example of a first operation for sharing a document image displayed in the private display space.
Figure 5B:
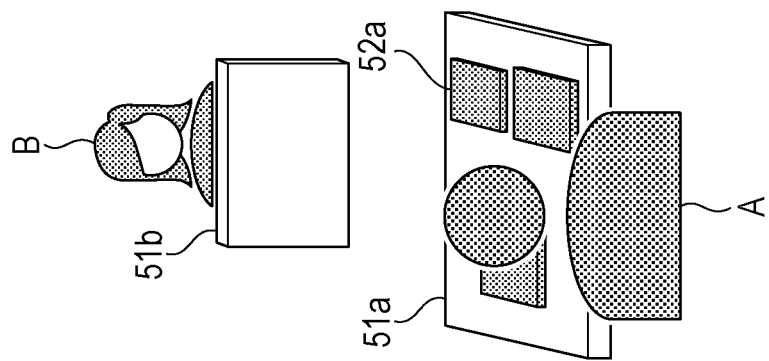
Figure 5A:
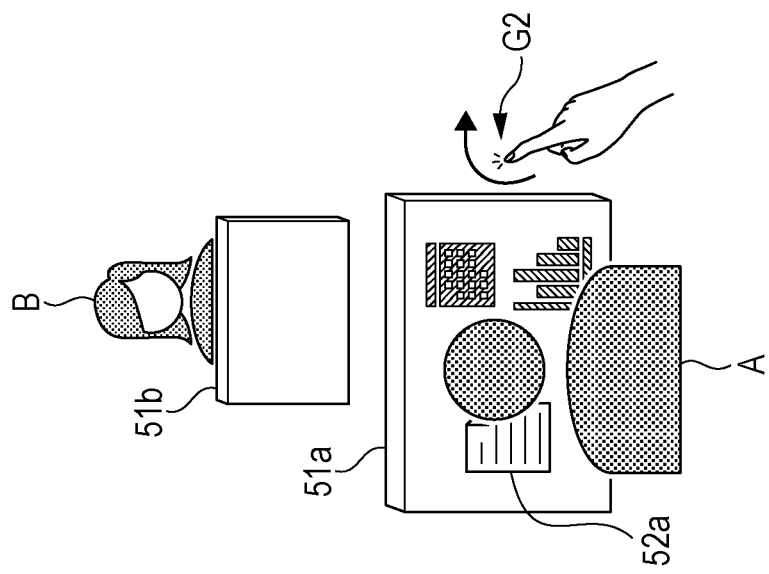

FIGS. 5A to 5C are views illustrating an example of a first operation for sharing the document image 52a displayed in the private display space 32a. The example of the first operation is an example of an effective operation particularly in sharing all of the document images 52 disposed on the desktop image 51a in the private display space 32a at a time.

As illustrated in FIG. 5A, the attendee A first makes a gesture G2 of pushing down the desktop image 51a in the private display space 32a.

As illustrated in FIG. 5B, the information display 10 then horizontally displays the desktop image 51a in the shared display space 31. The desktop image 51a is horizontally displayed in this case but may be displayed in such a manner as to be tilted within a predetermined angle with the horizontal. At this time, as illustrated in FIG. 5B, the information display 10 displays the document image 52a also horizontally in the attendee-A-side area for the desktop image 51a above the horizontally displayed desktop image 51a. Alternatively, only a specific page of multiple pages of the document image 52a may be displayed horizontally. The document image 52a or the specific page thereof is horizontally displayed in this case but may be displayed in such a manner as to be tilted within a predetermined angle with the horizontal. At this time, the information display 10 limits the displaying of the content of the document image 52a. For example, displaying the document image 52a in a thumbnail image or with lower resolutions is conceivable. In addition, displaying a designated document image 52a may be omitted.

In this state, the attendee A and the attendee B each make a gesture G3 of touching the document image 52a displayed on the desktop image 51a to view the document image 52a. As illustrated in FIG. 5C, the information display 10 then cancels the limitation on the displaying of the content of the document image 52a. Alternatively, the information display 10 may cancel the limitation on the displaying of the document image 52a when only the attendee B makes a gesture of touching the document image 52a (not illustrated). In this case, whether to cancel the displaying limitation for the attendee B may be verified with the attendee A.

If the attendee A makes a gesture of facing the document image 52a toward the attendee A in the state of FIG. 5B, the information display 10 displays the document image 52a at an angle allowing the attendee A to see the document image 52a in the shared display space 31. Also in this case, only a specific page of multiple pages of the document image 52a may be displayed at the angle allowing the attendee A to see the document image 52a. At this time, the information display 10 may also cancel the limitation on the displaying of the document image 52a.

The desktop image 51a is displayed vertically and thereafter displayed horizontally in this case, but the displaying is not limited thereto. The document image 52a may be displayed vertically and thereafter displayed horizontally.

Figure 6C:
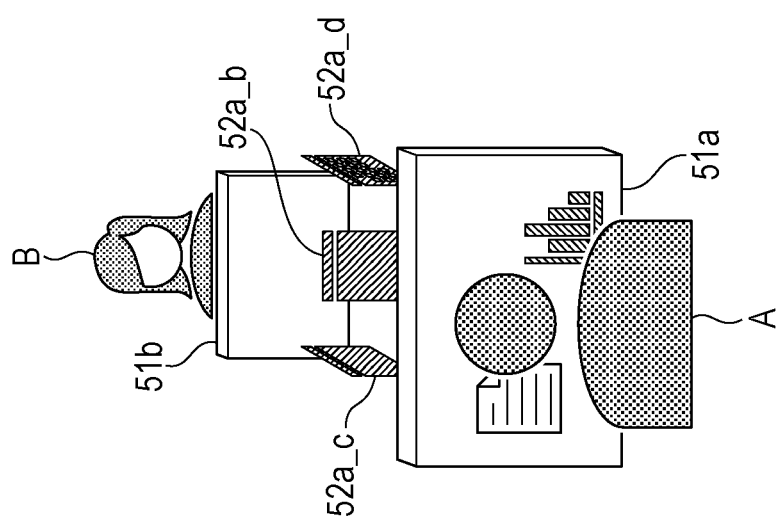
FIGS. 6A, 6B, and 6C are views illustrating an example of a second operation for sharing the document image displayed in the private display space.
Figure 6B:
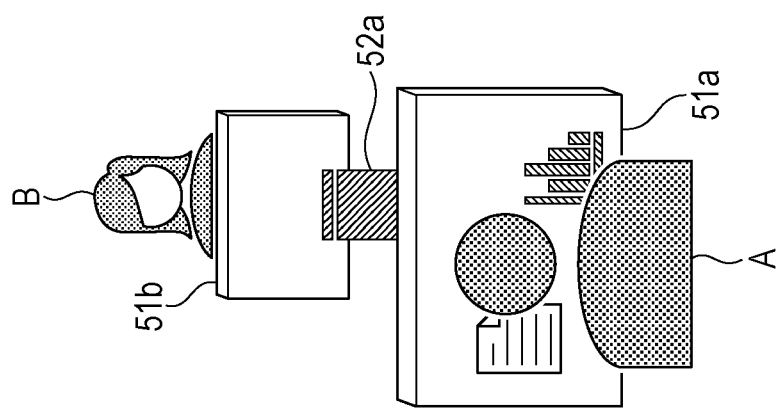
Figure 6A:
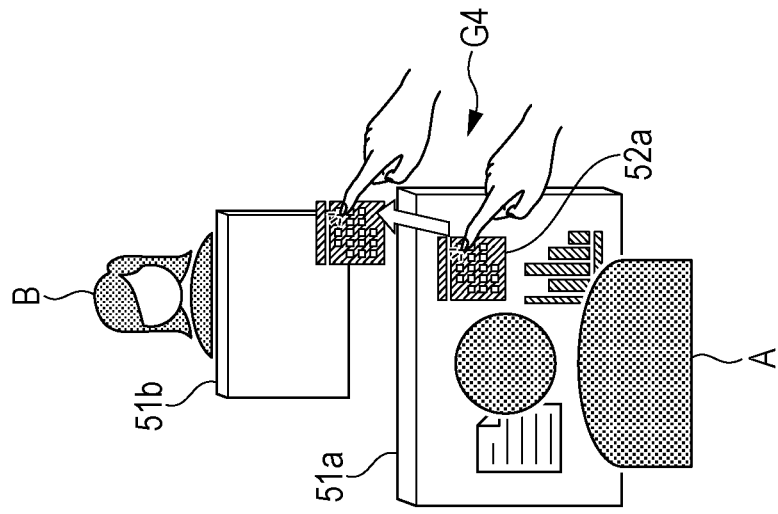

FIGS. 6A to 6C are views illustrating an example of a second operation for sharing the document image 52a displayed in the private display space 32a. The example of the second operation is an example of an effective operation particularly in setting the sharing of the document images 52 disposed on the desktop image 51a in the private display space 32a on a per-attendee basis.

As illustrated in FIG. 6A, the attendee A first makes a gesture G4 of touching the document image 52a displayed in the attendee-A-side area for the desktop image 51a in the private display space 32a and drag-and-dropping the document image 52a into the shared display space 31.

As illustrated in FIG. 6B, the information display 10 then displays the drag-and-dropped document image 52a in the shared display space 31. At this time, the document image 52a is displayed to cause the plane having the content thereof to face the attendee B. FIG. 6B represents this in such a manner that the back plane of the document image 52a without the content faces the attendee A.

If there are three or more attendees, the information display 10 makes duplicates of the document image 52a the number of which is the same as the number of the attendees and displays the document images 52a to cause the content of each document image 52a to face the corresponding attendee. FIG. 6C assumes that in addition to the attendees A and B, attendees C and D are respectively present on the right side and left side viewed from the attendee A, but this is not illustrated. In this case, the information display 10 displays a duplicate 52a b of the document image 52a for the attendee B to cause the plane having the content to face the attendee B, a duplicate 52a c of the document image 52a for the attendee C to cause the plane having the content to face leftwards, and a duplicate 52a d of the document image 52a for the attendee D to cause the plane having the content to face rightwards. At this time, only the duplicate 52a b for the attendee B is displayed between the desktop image 51a and the attendee B, and the duplicate 52a c for the attendee C and the duplicate 52a d for the attendee D are not displayed between the desktop image 51a and the attendee B.

Functional Configuration of Information Display

Figure 7:
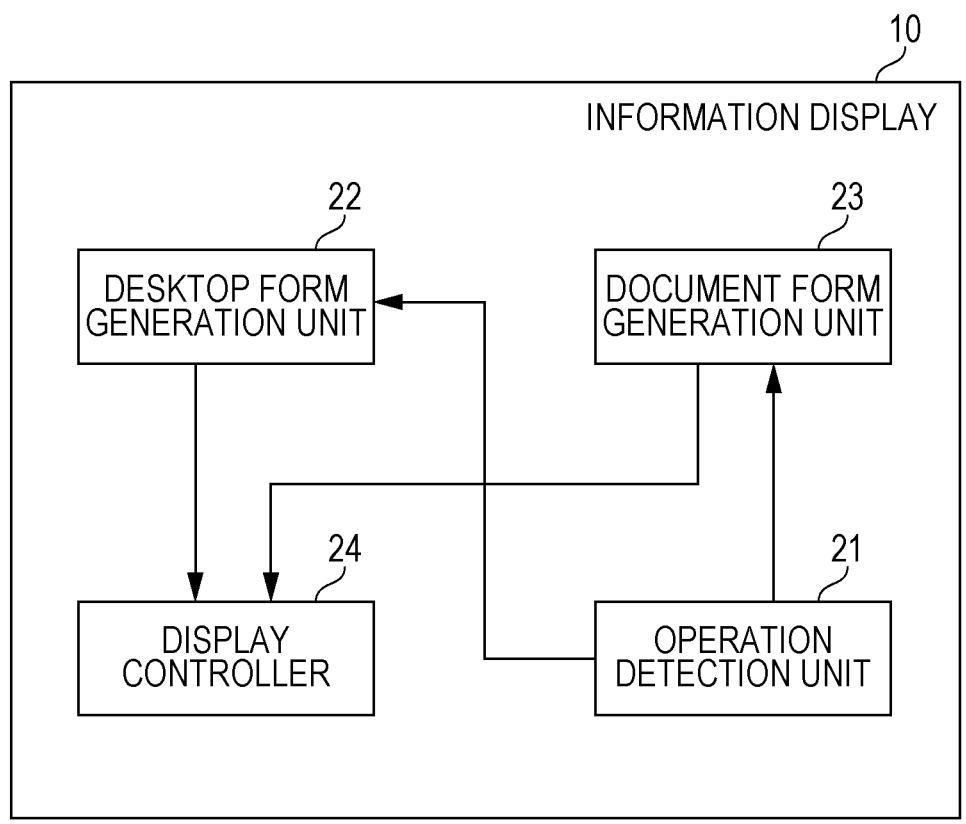
FIG. 7 is a block diagram illustrating an example functional configuration of the information display in the exemplary embodiment of the present disclosure.

FIG. 7 is a block diagram illustrating an example functional configuration of the information display 10 in this exemplary embodiment. As illustrated in FIG. 7, the information display 10 in this exemplary embodiment includes an operation detection unit 21, a desktop form generation unit 22, a document form generation unit 23, and a display controller 24.

When information regarding the movement of an attendee is input from the input I/F 16 or the communication I/F 14, the operation detection unit 21 detects the operation by the attendee from the operation information. For example, if an image of the operation by the attendee captured by the camera 161 is input from the input I/F 16, the operation detection unit 21 extracts the trajectory of a fingertip of the attendee from the image and identifies the gesture made by the attendee on the basis of the extracted trajectory. If the attendee wears a finger-worn wearable device equipped with an acceleration sensor, and if detection data (direction and speed) of the acceleration sensor transmitted from the wearable device by using Bluetooth (registered trademark) is input from the communication I/F 14, the operation detection unit 21 compares the detection data with known gesture patterns and identifies the gesture by the attendee on the basis of the comparison result. If the identified gesture is the gesture of swiping upwards in the private display space 32 by the specific attendee, the operation detection unit 21 detects an operation for preparing the desktop image 51 performed by the specific attendee. The identified gesture is a gesture of pushing down the desktop image 51 and the document image 52 or drag-and-dropping the document image 52 into the shared display space 31 by the specific attendee, the operation detection unit 21 detects an operation by the specific attendee for allowing the different attendee to view the document image 52. If the identified gesture is a gesture of touching the pushed down document image 52 by the specific attendee or the different attendee, the operation detection unit 21 detects an operation by the specific attendee or the different attendee for cancelling the limitation on the displaying of the document image 52.

Alternatively, when operation information transmitted by using Bluetooth (registered trademark) in response to an operation of the mouse cursor or a menu displayed in the air by using the keyboard or the mouse is input from the communication I/F 14, the operation detection unit 21 may detect the operation by the attendee from the operation information. Also in this case, the operation detection unit 21 detects the operation by the specific attendee for preparing the desktop image 51, the operation by the specific attendee for allowing the different attendee to view the document image 52, and the operation by the specific attendee or the different attendee for cancelling the limitation on the displaying of the document image 52.

In this exemplary embodiment, the operation by the specific attendee for preparing the desktop image 51 is used as an example of an operation by the specific observer for preparing the first image. The operation by the specific attendee for allowing the different attendee to view the document image 52 is used as an example of an operation by the specific observer for allowing the different observer to view the second image. Further, the operation by the specific attendee or the different attendee for cancelling the limitation on the displaying of the document image 52 is used as an example of an operation by at least one of the specific observer and the different observer for viewing by the different observer.

The desktop form generation unit 22 generates data (hereinafter, also referred to as a desktop form) indicating a three-dimensional form for displaying the desktop image 51 in the air. In this exemplary embodiment, the desktop form generation unit 22 is provided as an example of a unit that performs control to display the first image in the air.

Specifically, if the operation detection unit 21 detects the operation by the specific attendee for preparing the desktop image 51, the desktop form generation unit 22 generates a desktop form displayed vertically. However, the desktop form does not necessarily have to be displayed vertically. It suffices that the desktop form is displayed to make substantially a right angle with the horizontal plane. Substantially a right angle with the desktop form may be any angle allowing the document image 52 to be hidden in the first area. In this exemplary embodiment, substantially a right angle with the desktop form is used as an example of a first angle allowing the second image to be hidden in the first area, and the desktop form generation unit 22 is provided as an example of a unit that performs control to display the first image having the first angle with respect to the horizontal plane.

If the operation detection unit 21 detects the operation by the specific attendee for allowing the different attendee to view the document image 52, the desktop form generation unit 22 generates a desktop form displayed horizontally in the shared display space 31. However, the desktop form does not necessarily have to be displayed horizontally. It suffices that the desktop form is displayed to make a specific angle with the horizontal plane. The specific angle of the desktop form may be any angle smaller than substantially a right angle with the desktop form described above. In this exemplary embodiment, the desktop form generation unit 22 is provided as an example of a unit that performs control to display the first image having an angle smaller than the first angle with respect to the horizontal plane.

The document form generation unit 23 generates data (hereinafter, also referred to as a document form) indicating a three-dimensional form for displaying the document image 52 in the air. In this exemplary embodiment, the document form generation unit 23 is provided as an example of a unit that performs control to display the second image in the air.

Specifically, if the operation detection unit 21 detects the operation by the specific attendee for preparing the desktop image 51, and if a document is disposed on the desktop, the document form generation unit 23 also generates a document form displayed vertically. However, the document form does not necessarily have to be displayed vertically. It suffices that the document form is displayed to make substantially a right angle with the horizontal plane. Substantially a right angle with the document form may be any angle allowing the document image 52 to be hidden in the specific-attendee-side area. In this exemplary embodiment, substantially a right angle with the document form is used as an example of a second angle allowing the second image to be hidden in the first area, and the document form generation unit 23 is provided as an example of a unit that performs control to display the second image having the second angle with respect to the horizontal plane.

If the operation detection unit 21 detects the operation by the specific attendee for allowing the different attendee to view the document image 52, the document form generation unit 23 generates a document form displayed horizontally in the shared display space 31. However, the document form does not necessarily have to be displayed horizontally. It suffices that the document form is displayed to make a specific angle with the horizontal plane. The specific angle of the document form may be any angle smaller than substantially a right angle with the document form described above. In this exemplary embodiment, the document form generation unit 23 is provided as an example of a unit that performs control to display the second image having an angle smaller than the second angle with respect to the horizontal plane. At this time, the document form generation unit 23 generates a document form having content limitedly displayed. In this sense, the document form generation unit 23 is an example of a unit that performs limitation on displaying of an object that is formed in the second image and that is to be observed by the specific observer. If the operation detection unit 21 detects the operation by the specific attendee or the different attendee for cancelling the limitation on the displaying of the content of the document image 52 in this state, the document form generation unit 23 generates a document form with cancelled displaying limitation. In this sense, the document form generation unit 23 is an example of a unit that cancels the limitation on the displaying of the object that is formed in the second image and that is to be observed by the specific observer.

Further, if the operation detection unit 21 detects the operation by the specific attendee for allowing the different attendee to view the document image 52, the document form generation unit 23 generates a document form displayed in the air in the shared display space 31 in some cases. In this exemplary embodiment, the document form generation unit 23 is provided as an example of a unit that performs control to display the second image in the air in the second area. At this time, the document form generation unit 23 generates a document form displayed in such a manner that the plane having the content of the document image 52 faces the different attendee. In this sense, the document form generation unit 23 is an example of a unit that performs control to display the object facing the different observer. The object is formed in the second image and is to be observed by the specific observer.

The display controller 24 converts the desktop form generated by the desktop form generation unit 22 and the document form generated by the document form generation unit 23 to reproduced wave front information. The display controller 24 outputs the reproduced wave front information to the SLM 152 and performs control to display the desktop image 51 and the document image 52 in the air.

Operations of Information Display

Figure 8:
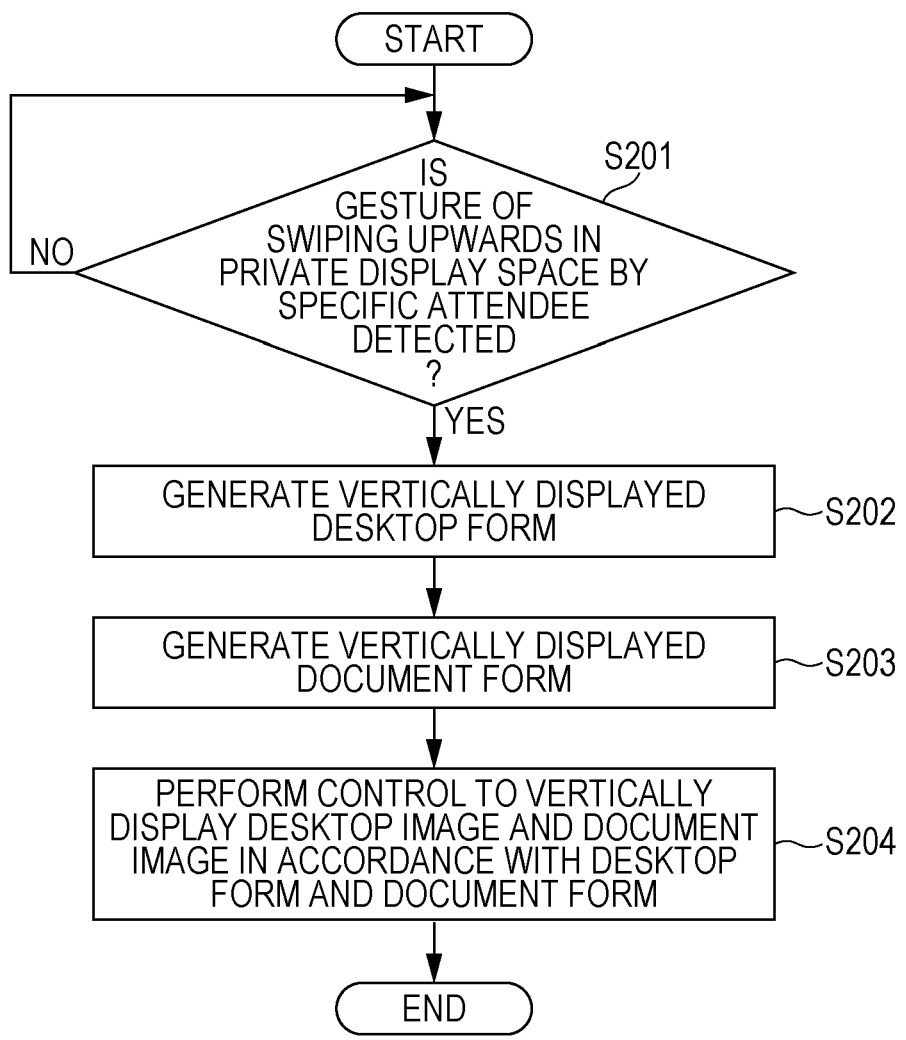
FIG. 8 is a flowchart illustrating an example of operations of the information display in the exemplary embodiment of the present disclosure in displaying the desktop image and the document image in the air at first.

FIG. 8 is a flowchart illustrating an example of the operations of the information display 10 in displaying the desktop image 51 and the document image 52 in the air at first.

As illustrated in FIG. 8, in the information display 10, the operation detection unit 21 first detects whether the gesture of swiping upwards in the private display space 32 by the specific attendee is detected (step S201).

If the operation detection unit 21 consequently does not determine that the gesture of swiping upwards in the private display space 32 by the specific attendee is detected, the operation detection unit 21 performs step S201 again.

In contrast, if the operation detection unit 21 determines that the gesture of swiping upwards in the private display space 32 by the specific attendee is detected, the desktop form generation unit 22 generates a desktop form displayed vertically (step S202).

The document form generation unit 23 generates a document form displayed vertically (step S203).

The display controller 24 performs control to display the desktop image 51 and the document image 52 vertically on the basis of the desktop form generated in step S202 and the document form generated in step S203 (step S204). Specifically, the display controller 24 converts the desktop form generated in step S202 and the document form generated in step S203 to reproduced wave front information. The display controller 24 outputs the reproduced wave front information to the SLM 152 and performs control to vertically display the desktop image 51 and the document image 52.

Figure 9:
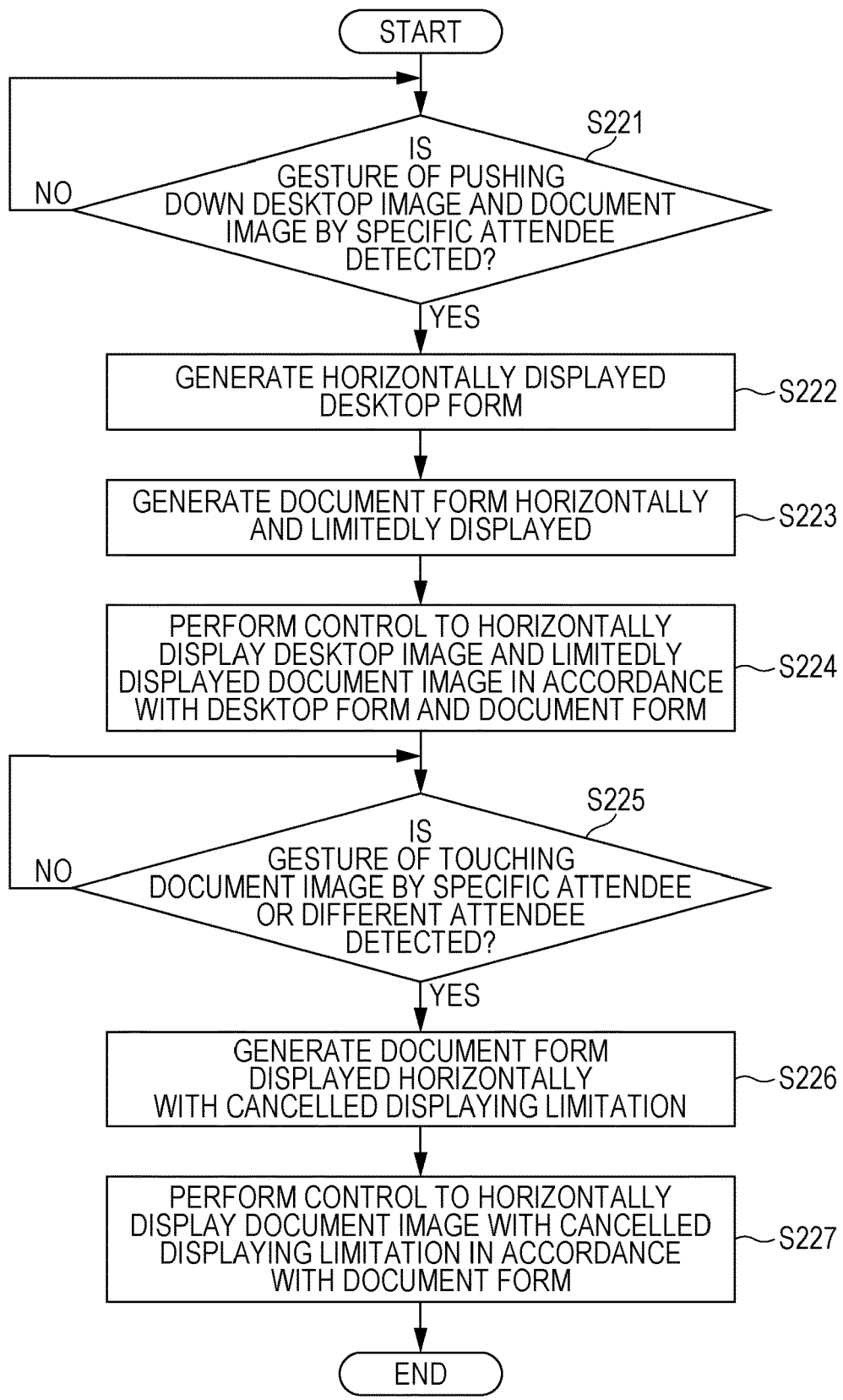
FIG. 9 is a flowchart illustrating an example of first operations of the information display in the exemplary embodiment of the present disclosure in sharing the document image displayed in the private display space.

FIG. 9 is a flowchart illustrating an example of the first operations of the information display 10 in sharing the document image 52 displayed in the private display space 32.

As illustrated in FIG. 9, in the information display 10, the operation detection unit 21 first detects whether a gesture of pushing down the desktop image 51 and the document image 52 by the specific attendee is detected (step S221).

If the operation detection unit 21 consequently does not determine that the gesture of pushing down the desktop image 51 and the document image 52 by the specific attendee, the operation detection unit 21 performs step S221 again.

In contrast, if the operation detection unit 21 determines that the gesture of pushing down the desktop image 51 and the document image 52 by the specific attendee is detected, the desktop form generation unit 22 generates a desktop form displayed horizontally (step S222).

The document form generation unit 23 generates a document form horizontally and limitedly displayed (step S223).

The display controller 24 performs control to horizontally display the desktop image 51 and the limitedly displayed document image 52 on the basis of the desktop form generated in step S222 and the document form generated in step S223 (step S224). Specifically, the display controller 24 converts the desktop form and the document form to reproduced wave front information. The display controller 24 outputs the reproduced wave front information to the SLM 152 and performs control to vertically display the desktop image 51 and the limitedly displayed document image 52.

The operation detection unit 21 determines whether the gesture of touching the document image 52 displayed horizontally in step S224 is detected, the gesture being made by the specific attendee or the different attendee (step S225).

If the operation detection unit 21 consequently does not determine that the gesture of touching the document image 52 by the specific attendee or the different attendee is detected, the operation detection unit 21 performs step S225 again.

In contrast, if the operation detection unit 21 determines that the gesture of touching the document image 52 by the specific attendee or the different attendee is detected, the desktop form generation unit 22 generates a document form displayed horizontally with cancelled displaying limitation (step S226).

The display controller 24 performs control to display the document image 52 horizontally with cancelled displaying limitation on the basis of the document form generated in step S226 (step S227). Specifically, the display controller 24 converts the document form generated in step S226 to reproduced wave front information. The display controller 24 outputs the reproduced wave front information to the SLM 152 and performs control to horizontally display the document image 52 with cancelled displaying limitation. At this time, it is desirable to continue displaying the desktop image 51 displayed in step S224 and to display the document image 52 with cancelled displaying limitation in step S227, instead of the document image 52 displayed in step S224.

FIG. 10 is a flowchart illustrating an example of the second operations of the information display 10 in sharing the document image 52 displayed in the private display space 32.

As illustrated in FIG. 10, in the information display 10, the operation detection unit 21 first detects whether a gesture of drag-and-dropping the document image 52 into the shared display space 31 by the specific attendee is detected (step S241).

If the operation detection unit 21 consequently does not determine that the gesture of drag-and-dropping the document image 52 into the shared display space 31 by the specific attendee is detected, the operation detection unit 21 performs step S241 again.

In contrast, if the operation detection unit 21 determines that the gesture of drag-and-dropping the document image 52 into the shared display space 31 by the specific attendee is detected, the document form generation unit 23 generates document forms displayed in the shared display space 31 for respective different attendees (step S242).

The document form generation unit 23 modifies the orientation of the document forms generated in step S242 the number of which corresponds to the number of different attendees to cause the document forms to face the respective attendees (step S243).

The display controller 24 performs control to display the document images 52 in the shared display space 31 on the basis of the document forms generated in step S242 and modified in step S243 (step S244). Specifically, the display controller 24 converts the document forms generated in step S242 and modified in step S243 to reproduced wave front information. The display controller 24 outputs the reproduced wave front information to the SLM 152 and performs control to display the document images 52 in the shared display space 31. At this time, it is desirable to continue displaying the desktop image 51 displayed in step S204 in FIG. 8 and to display the document images 52 in the shared display space 31 in step S244, instead of the document image 52 displayed in step S204 in FIG. 8.

In this embodiment, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In this embodiment, the term "processor" is broad enough to encompass one processor or plural processors in collaboration which are located physically apart from each other but may work cooperatively. The order of operations of the processor is not limited to one described in this embodiment, and may be changed.

The processing performed by the information display 10 in this exemplary embodiment is prepared as a program such as application software.

That is, the program that implements this exemplary embodiment is regarded as a program causing a computer to execute a process including performing control to display, in the air, a first image that is observable in an ambient area of the first image and hinders a different image displayed in the air in a first area from being viewed from a second area. The first area is positioned on a first side of the first image. The first side faces a specific observer. The second area is positioned on a second side of the first image opposite to the first side. The process also includes performing control to display, in the air in the first area, a second image observable in an ambient area of the second image.

The program that implements this exemplary embodiment may be provided not only by using a communication medium as a matter of course but also in such a manner as to be recorded in a recording medium such as a compact disc read-only memory (CD-ROM).

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising:
a processor configured to:
perform control to display, in the air, a first image that is observable from opposite sides within an ambient area of the first image and the first image hinders a different image displayed in the air on a first side of the first image from being viewed from a second side of the first image, the first side facing a specific observer; and
perform control to display, in the air on the first side, a second image observable in an ambient area of the second image,
wherein the second image includes a third image in which an object to be observed by the specific observer is formed and a fourth image to improve visibility of the third image, the fourth image being positioned between the first image and the second image.

2. The information processing apparatus according to claim 1,
wherein the first image comprises an image hindering the second image from being viewed from the second side of the first image.

3. The information processing apparatus according to claim 1,
wherein the first image has luminance higher than luminance of the second image.

4. The information processing apparatus according to claim 1,
wherein the fourth image has luminance higher than luminance of the third image.

5. The information processing apparatus according to claim 1,
wherein the first image has a plate like shape.

6. The information processing apparatus according to claim 5,
wherein in response to an operation performed by the specific observer for preparing the first image, the processor performs control to display the first image having a first angle with respect to a horizontal plane, the first angle allowing the second image to be hidden in the first side of the first image.

7. The information processing apparatus according to claim 1,
wherein the first image and the second image each have a plate like shape.

8. The information processing apparatus according to claim 7,
wherein the processor
performs control to display the first image having a first angle with respect to a horizontal plane, the first angle allowing the second image to be hidden in the first side of the first image, and
performs control to display the second image having a second angle with respect to the horizontal plane, the second angle allowing the second image to be hidden in the first side of the first image.

9. The information processing apparatus according to claim 8,
wherein in response to an operation performed by the specific observer for allowing a different observer to view the second image, the processor performs control to display the first image having an angle smaller than the first angle with respect to the horizontal plane and the second image having an angle smaller than the second angle with respect to the horizontal plane.

10. The information processing apparatus according to claim 9,
wherein when the processor displays the first image and the second image, the processor performs limitation on displaying of an object that is formed in the second image and that is to be observed by the specific observer.

11. The information processing apparatus according to claim 10,
wherein in response to an operation performed by at least one of the specific observer and the different observer for viewing by the different observer, the processor cancels the limitation on the displaying of the object that is formed in the second image and that is to be observed by the specific observer.

12. The information processing apparatus according to claim 10,
wherein when the processor displays the second image, the processor performs control to display the object facing the different observer, the object being formed in the second image and being to be observed by the specific observer.

13. The information processing apparatus according to claim 1,
wherein in response to an operation performed by the specific observer for allowing a different observer to view the second image, the processor performs control to display the second image in the air in the second side of the first image.

14. A non-transitory computer readable medium storing a program causing a computer to execute a process comprising:
performing control to display, in the air, a first image that is observable from opposite sides within an ambient area of the first image and the first image hinders a different image displayed in the air on a first side of the first image from being viewed from a second side of the first image, the first side facing a specific observer; and
performing control to display, in the air on the first side, a second image observable in an ambient area of the second image,
wherein the second image includes a third image in which an object to be observed by the specific observer is formed and a fourth image to improve visibility of the third image, the fourth image being positioned between the first image and the second image.

15. An information processing apparatus comprising:
a processor configured to:
perform control to display, in the air, a first image that is observable from opposite sides within an ambient area of the first image and the first image hinders a different image displayed in the air on a first side of the first image from being viewed from a second side of the first image, the first side facing a specific observer; and
perform control to display, in the air on the first side, a second image observable in an ambient area of the second image, wherein
the first image and the second image each have a plate like shape, the processor
- performs control to display the first image having a first angle with respect to a horizontal plane, the first angle allowing the second image to be hidden in the first side of the first image, and
- performs control to display the second image having a second angle with respect to the horizontal plane, the second angle allowing the second image to be hidden in the first side of the first image, and
- in response to an operation performed by the specific observer for allowing a different observer to view the second image, the processor performs control to display the first image having an angle smaller than the first angle with respect to the horizontal plane and the second image having an angle smaller than the second angle with respect to the horizontal plane.

16. A non-transitory computer readable medium storing a program causing a computer to execute a process comprising:
- performing control to display, in the air, a first image that is observable from opposite sides within an ambient area of the first image and the first image hinders a different image displayed in the air on a first side of the first image from being viewed from a second side of the first image, the first side facing a specific observer, the first image and the second image each have a plate like shape; and
- performing control to display, in the air on the first side, a second image observable in an ambient area of the second image,
- performing control to display the first image having a first angle with respect to a horizontal plane, the first angle allowing the second image to be hidden in the first side of the first image,
- performing control to display the second image having a second angle with respect to the horizontal plane, the second angle allowing the second image to be hidden in the first side of the first image, and
- in response to an operation performed by the specific observer for allowing a different observer to view the second image, the performing control to display the first image having an angle smaller than the first angle with respect to the horizontal plane and the second image having an angle smaller than the second angle with respect to the horizontal plane.

* * * * *